United States Patent [19]
Hurlburt

[11] 3,724,183
[45] Apr. 3, 1973

[54] REEL DRIVE TRAIN
[75] Inventor: Joseph C. Hurlburt, Leola, Pa.
[73] Assignee: Sperry Rand Corporation, New Holland, Pa.
[22] Filed: Dec. 30, 1971
[21] Appl. No.: 213,858

Related U.S. Application Data

[63] Continuation-in-part of Ser. No. 71,551, Sept. 11, 1970, Pat. No. 3,664,101.

[52] U.S. Cl. ..................................56/14.3, 56/220
[51] Int. Cl. .............................................A01d 47/00
[58] Field of Search.......56/14.3, 220, 221, 222, 223, 56/224, 225, 226, 227

[56] References Cited

UNITED STATES PATENTS

| | | | |
|---|---|---|---|
| 3,360,912 | 1/1968 | Erdman et al. | 56/220 |
| 1,179,707 | 4/1916 | Downing | 56/223 |
| 3,283,487 | 11/1966 | Jarvis | 56/222 |

*Primary Examiner*—Antonio F. Guida
*Attorney*—John C. Thompson et al.

[57] ABSTRACT

A drive train adapted to drive a reel assembly having multiple reel sections. Disposed in side-by-side relationship, the reel sections are rotatively mounted about a main support tube and driven through a gear drive that includes a main drive shaft journalled within said main support tube and having a series of pinion gears fixed thereto and laying open through openings formed within said main support tube. Each pinion gear is meshed with an internal gear carried by a reel spider such that the rotation of said main drive shaft results in the simultaneous timed rotation of each reel section.

11 Claims, 7 Drawing Figures

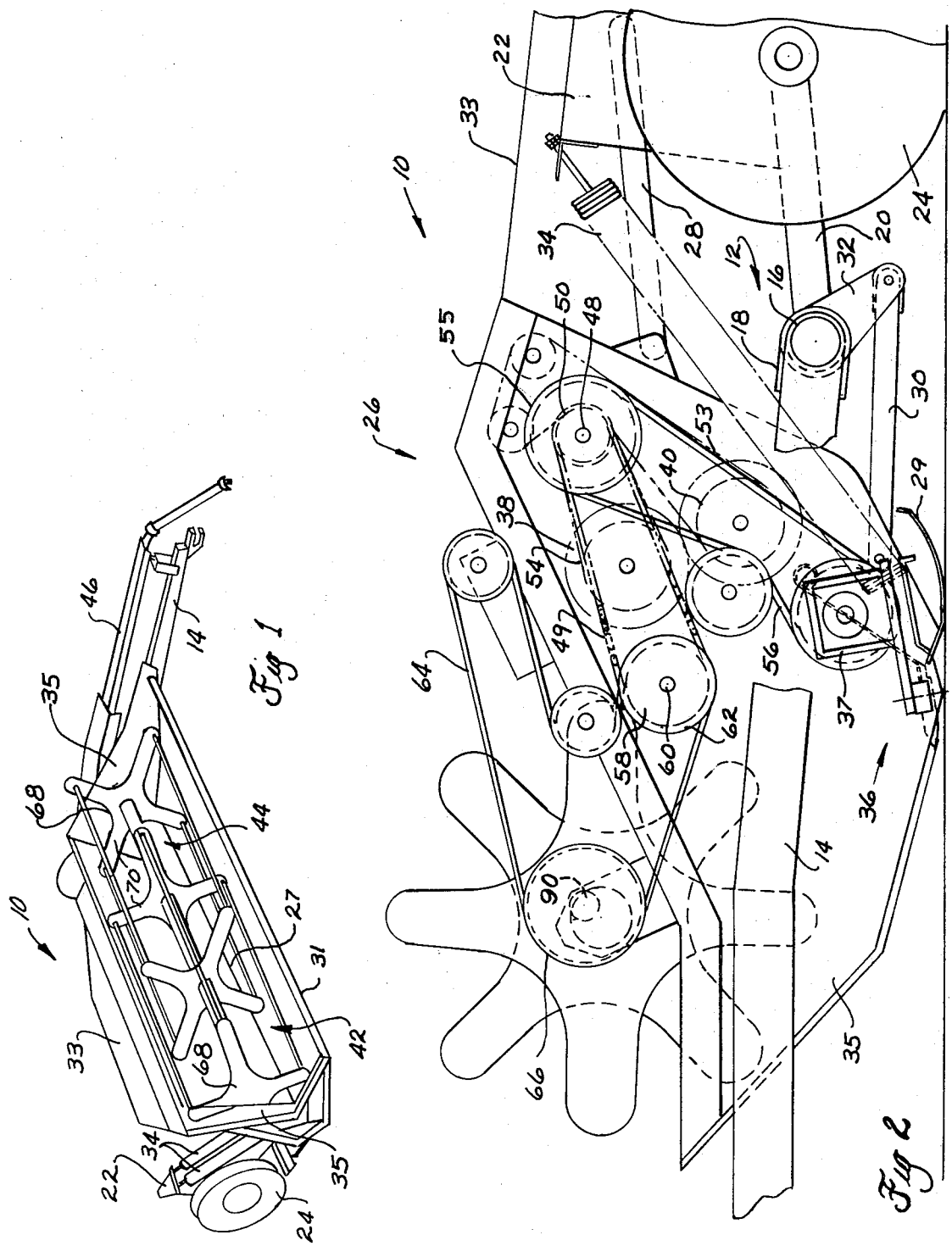

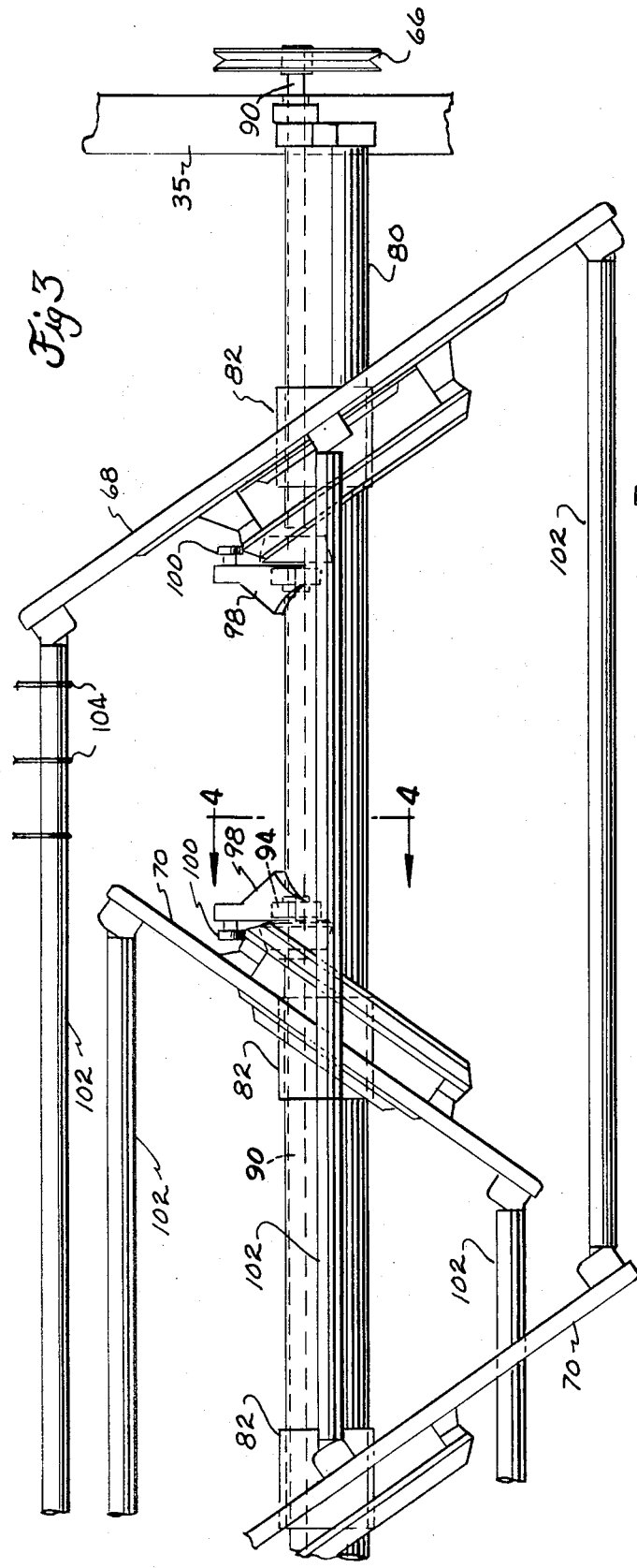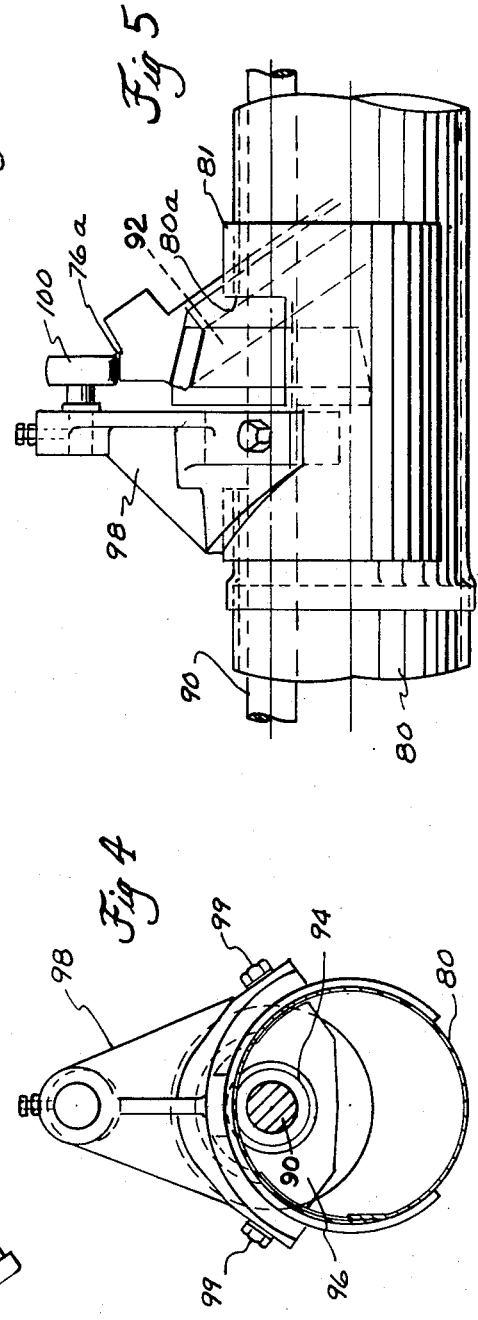

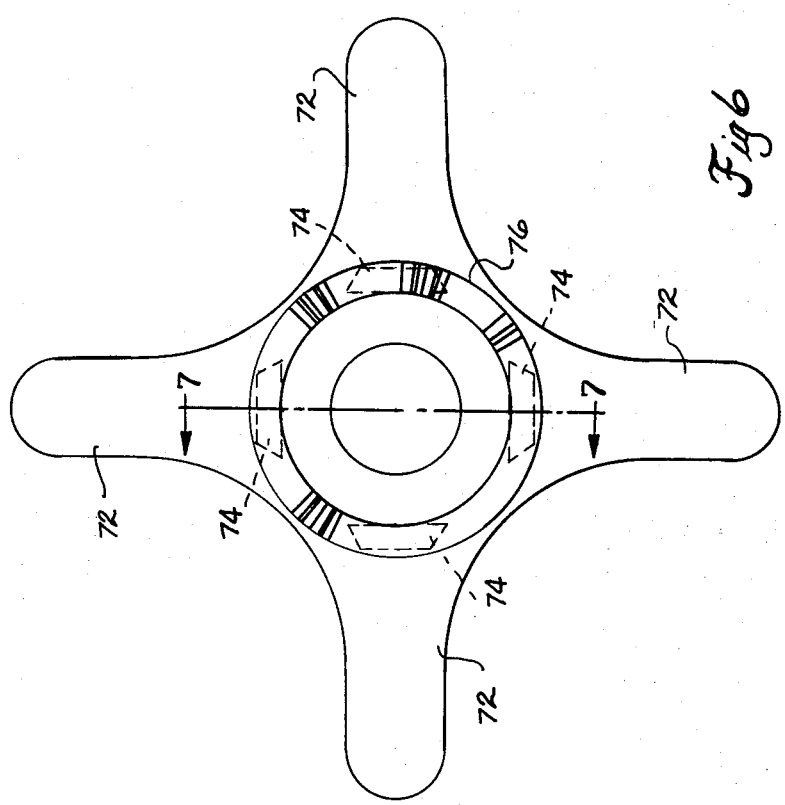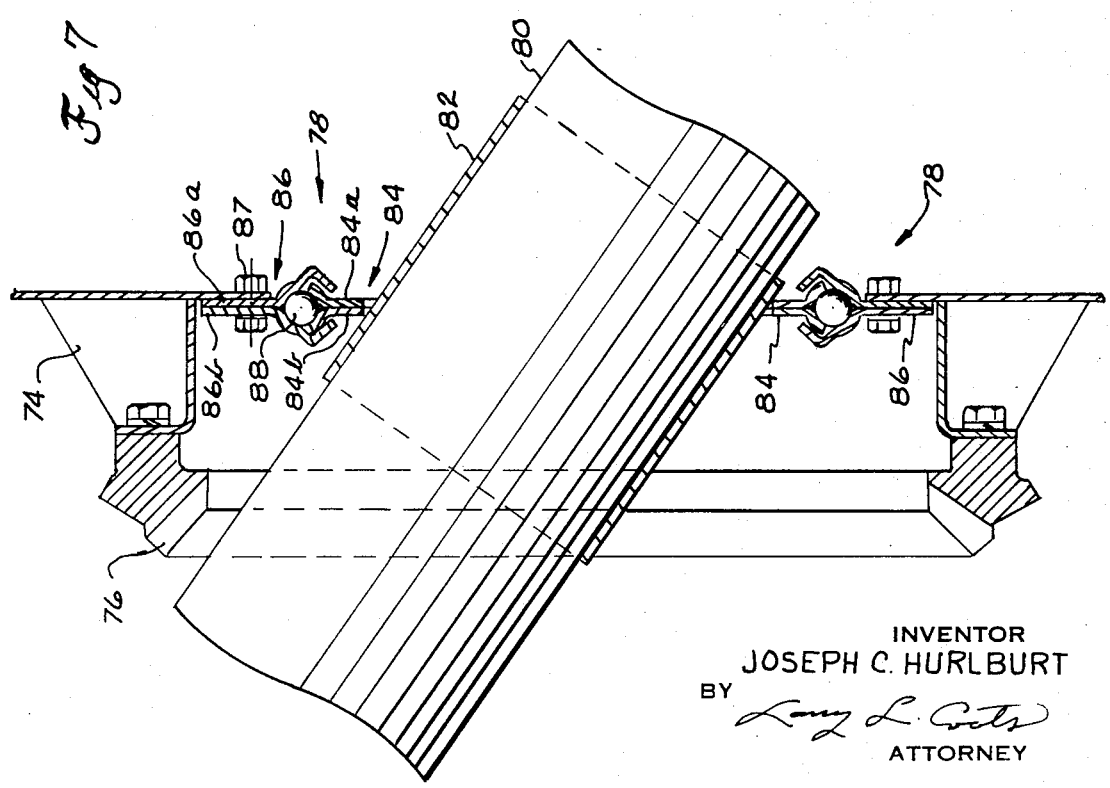

3,724,183

REEL DRIVE TRAIN

This is a continuation in part of U. S. Patent application Ser. No. 71,551, filed Sept. 11, 1970, now issued U.S. Pat. No. 3,664,101, issued May 23, 1972 entitled "Crop Gathering and Converging Reel," hereafter referred to as the parent application.

BACKGROUND OF THE INVENTION

The present invention relates to agricultural machinery and in particular to a crop gathering reel and the drive train therefore.

Many agricultural harvesting machines employ a crop gathering reel generally forward and above a cutter bar, the crop gathering reel functioning to engage standing crop material and sweep the crop material past the cutter bar where the crop is cut. In most harvesting machines of today, the conventional reel includes a basic reel structure fixed to a main drive shaft which is journalled for rotation transversely within the header of the harvesting machine. To drive the reel, a sheave is normally fixed to one end of the main drive shaft and is driven by a side belt drive, consequently driving the main drive shaft and the reel structure.

In the interest of capacity and overall efficiency, harvesting machines of all types including combines, windrowers and mower-conditioners are presently being designed to cut a wider swath of crop material. It necessarily follows that to yield a wider cut, the header of the harvesting machine must be made wider. This has naturally called for a wider reel design. Moreover, some reel designs such as that shown in the parent application called for the use of multiple reel sections, which in the case of the parent application converged the cut crop material rearwardly. The conventional design, as discussed above, is deemed undesirable for driving reels of substantial width because the driving force would only be applied at one point on the reel, and consequently to drive the entire reel structure, without risking possible failure within the total reel structure, the complete reel must be built of relatively high strength material which means a more expensive reel. In the case of the more complex and sophisticated rails, such as that shown in the parent application, the conventional reel drive is thought to be totally unworkable. In this latter instance, it will be observed that the inner portions of the multiple reel sections overlap, therefore it becomes absolutely necessary to drive the reel sections in time relationship to avoid interference between the overlapped area. It is doubtful that such could be accomplished on a reliable basis with a belt drive such as applied in the conventional reels.

SUMMARY OF THE INVENTION

In light of the above, applicant has devised a novel and simple drive train for driving multiple reel sections of a reel assembly in time relationship, and particularly designed to drive the reel assembly at numerous points along the axis thereof. Specifically, the drive train of the present invention comprises a main drive shaft extending through a tube supporting the reel assembly. Spaced along said main drive shaft and fixed thereto are a series of pinion gears that are exposed by openings formed within said reel support tubes. Rotatively mounted on said support tube adjacent each pinion gear is a spider having an internal gear fixed thereto, said internal gear being particularly spaced for meshing engagement with a respective pinion gear. Thus, the rotation of said main drive shaft results in the rotation of the reel assembly about the support tube as driving torque is applied to particular reel spiders through the internal and pinion gear arrangement, thereby providing a direct positive drive to the reel assembly.

It is therefore a principle object of the present invention to provide a direct positive drive to the reel assembly of an agricultural harvesting machine.

More particularly, an object of the present invention is to provide a direct positive drive to the reel assembly, as referred to in the above paragraph, in the form of a gear drive.

Another object of the present invention is to provide a drive train for a reel assembly that drives numerous points along the reel assembly, as opposed to driving a single end portion of a main reel shaft as done by the more conventional reel drives.

A further principle object of the present invention resides in the provision of a reel assembly drive train for driving multiple reel sections in time relationship.

A more particular object of the present invention resides in the provision of a reel assembly drive train that includes a main drive shaft not having the burden of supporting the reel assembly, but journalled for rotation within a separate main reel assembly support tube; said main drive shaft having a series of spaced pinion gears fixed thereon and exposed through openings formed within said main support tube for engaging respective driven gears fixed to particular reel assembly spiders disposed adjacent each of said pinion gears.

A more particular object of the present invention resides in the provision of the driven gears, referred to in the above paragraph, in the form of internal gears with each internal gear fixed to a respective spider in coaxial relationship and disposed about the main support tube such that the main drive shaft with the pinion gears fixed thereto generally extends through each spider and associated internal gear.

Another object of the present invention resides in the provision of a drive train for a reel assembly that comprises multiple reel sections disposed in side-by-side relationship with each reel section generally being comprised of a pair of spiders each disposed obliquely to the principle axis of the reel assembly and interconnected by a series of tine bearing tine bars, the particular drive train for the multi-reel section reel assembly of the present object including (1) a main hollow support tube, (2) multi-reel sections disposed generally in side-by-side relationship along said support tube with each reel section including at least two spiders bearing around the surface of the support tube, (3) at least one internal bevel gear coaxially fixed to a particular spider of each reel section and disposed such that the internal gear surrounds the main support tube, (4) a main drive shaft journalled for rotation within said main support tube, and (5) a series of pinion gears spaced along said main drive shaft and fixed thereto so as to be exposed through openings formed within said main support tube and particularly spaced for meshing engagement with a respective internal gear disposed around said main support tube.

A further object of the present invention is to provide a drive train for a reel assembly that comprises a gear drive for transferring the driving torque of a drive shaft directly to the spider elements of a reel assembly.

Another object of the present invention resides in the provision of a drive train for a reel assembly that generally comprises a pinion gear fixed to a drive shaft and meshed with an internal ring gear that is carried directly by a spider element of the reel assembly, and the provision of means spaced from said pinion gear and continually engaged with said internal gear for assuring continuous engagement between the pinion and internal gear.

It is the overall object of the present invention to provide a simple, sturdy, reliable and economical drive train and support structure for a reel assembly.

Other objects and advantages of the present invention will become apparent from a study of the following description and the accompanying drawings which are merely illustrative of the present invention.

BRIEF DESCRIPTION OF THE DRAWINGS

FIG. 1 is a perspective view of a pull type mower conditioner having a reel assembly driven by a reel drive train comprising the present invention.

FIG. 2 is a fragmentary side elevational view of the mower conditioner of FIG. 1, showing particularly the manner of driving the various elements of the mower conditioner.

FIG. 3 is a fragmentary view of the reel assembly of the mower conditioner and the drive train therefore.

FIG. 4 is a view taken along the line 4—4 of FIG. 3.

FIG. 5 is an enlarged fragmentary side elevational view of the main support tube of the reel assembly, showing, also, the main drive shaft, pinion and internal gear for transferring the driving torque of the main drive shaft to a respective spider of the reel assembly.

FIG. 6 is a view of the spider of the reel assembly having an internal gear mounted thereon.

FIG. 7 is a view taken through the line 7—7 of FIG. 6.

DESCRIPTION OF THE PREFERRED EMBODIMENT

With reference to the drawings, particularly FIGS. 1 and 2, a pull type mower conditioner is shown therein and indicated generally by the numeral 10. The mower conditioner 10 basically comprises an L-shaped main frame 12 which includes a fore-and-aft extending hitching beam 14 pivotally connected to a transfer support tube 16 by a strap structure 18. Extending rearwardly from opposite end portions of the transverse support tube 16 are a pair of wheel arms 20, the wheel arms 20 being fixed to the support tube and having upright members 22 fixed to the rear ends of each. A pair of wheels 24, only one of which is shown, is rotatably mounted in the rear portions of the wheel arms 20.

In FIG. 2, it will be noted that a header, indicated generally by the numeral 26, is carried by a front portion of the main frame 12 of the mower conditioner. Specifically, the header 26 is carried by a parallel four bar linkage that includes a lower link 30 and an upper link 28 disposed on each side of the mower conditioner. The upper links 28 connect the header with the upright supports 22 while the lower links are pivotally interconnected between the header and a connecting link 32 which is pivotally connected to the transverse support tube 16. The header is biased upwardly by a spring structure 34 interconnecting the header with the upright members 22. Although not particularly shown, the spring 34 includes two pairs of springs with each pair of springs being disposed on one side of the mower conditioner 10. About the bottom portion of the header and to each side is a shoe denoted by the numeral 29. The shoe 29 during the operation of the mower conditioner engages the ground and as the header moves over various undulations in the ground. The spring structure 34 tends to bias the header 26 upwardly such that a floating characteristic is realized. Because of the parallel four bar linkage disposed on each side of the mower conditioner 10, the entire header 26 is generally constrained to move up and down over undulations in the ground being traversed.

With reference to the general frame structure of the header 26, it will be seen from FIGS. 1 and 2 that a pair of laterally spaced, rearwardly converging side sheets 35 are provided. Front portions of the side sheets 35 are interconnected by a pusher bar 31, while a floor 27 interconnects rear bottom portions of the side sheets. Formed about the rear of the header 26 and extending rearwardly therefrom is a windrow shield, denoted by the numeral 33. As those skilled in the art will realize, the windrow shield acts on the cut crop material being discharged by the harvesting machine, whether it be a mower-conditioner or simply a windrower, tending to converge the cut crop material and deposit it in a relatively narrow swath.

As best seen in FIG. 2, header 26 includes various elements that act on the crop during the operation of the mower conditioner 10. In this regard, a sickle bar assembly, inducted generally by the numeral 26, is disposed transversely about a lower intermediate portion of the header. A convention wobble drive 37 is provided to drive the sickle bar assembly 26. Spaced upwardly and rearwardly from the sickle bar assembly 36 is an upper and lower cooperating conditioning roll 38,40, respectively, the rolls being rotatively mounted transversely within said header 26. It is noted that the upper roll 38 is spaced slightly forwardly of the lower roll 40.

Mounted forwardly of the sickle bar assembly 36 and conditioning rolls is a converging reel assembly having first and second reel sections 42,44 respectively. A more detail description and discussion will be forth coming on the reel assembly and particularly the drive train therefore.

Turning to the drive system for driving these various elements of the header 26 (i.e. sickle bar assembly 36 and conditioning rolls 38, 40), power is supplied by a prime mover such as a tractor, not shown, which is adapted to pull the mower conditioner 10 through the field. A side drive line 46 (FIG. 1) is used to interconnect the prime mover with a right angle gearbox, not particularly shown herein, but clearly illustrated in the parent application (U.S. Ser. No. 71,551) and denoted in FIG. 6 therein by the numeral 114. The output of the right angle gearbox is applied to a shaft 48 which has fixed thereon in axially spaced apart relationship a first chain sprocket 50, a second chain sprocket set (not shown), including a pair of sprockets welded together, and a drive sheave 55. The drive sheave 55 is drivingly interconnected to the wobble drive 37 by a belt 56. A pair of chains 54,53 are utilized to drive the upper and lower conditioning rolls from the chain sprocket set (not shown) mounted on shaft 48, with chain 54 being trained around one sprocket of the set and a sprocket fixed to the upper roll 38, and chain 53 trained around the other sprocket of the sprocket set and a sprocket fixed to the lower conditioning roll 40. Another chain, chain 49, is trained around sprocket 50 and drives another forwardly spaced sprocket 58 which in turn drives shaft 60 and sheave 62 fixed thereon. Finally, sheave 55, through a series of idlers, drives the reel assembly by way of a belt trained around sheave 66, which as will be described later in detail, is fixed to a main drive shaft of the reel drive train.

As pointed out above, the header reel assembly includes first and second reel sections 42,44. Each reel section is rotatively mounted about a main hollow support tube 80 which is supported at opposite ends by the header side walls 35. It will be noted that each reel section includes an outer spider 68 and an inner spider 70, each spider of each reel section being disposed obliquely to the primary axis of said main support tubes 80 and lying substantially in parallel planes. As seen in FIG. 6, each spider includes a plurality of radially extending arms 72. Each spider further includes an internal beveled gear 76 mounted in coaxial relationship thereto by a series of circumferentially spaced gear mounts 74.

A bearing assembly 78 rotatively mounts each spider obliquely about the main support tube 80. With reference to FIG. 7, it is noted that a collar 82 is fixed by weldment, or other suitable means, around the outer surface of the main support tube 80, and in like manner other collars are spaced along said support tube at intervals corresponding generally to the distance between spiders. Each bearing assembly 78 includes an inner race 84 composed of like members 84a, 84b secured together and welded around the collar 82. Spaced above the inner race 84, as best seen in FIG. 7, is an outer race 86, also including like members 86a, 86b secured together by a bolt and nut assembly 87, which also secures the whole outer race 86 to a respective gear mount 74. Confined between the outer race 86 and inner race 84 are a series of ball bearings 88.

Turning now to the reel drive train, from FIGS. 3 and 5 it is seen that a main drive shaft 90 extends through the hollow main reel assembly support tube 80. As previously noted, one end of the main drive 90 has fixed thereon a sheave 66 which is driven by belt 64 (FIG. 2). Additionally, with regard to the reel assembly support tube 80, for obvious reasons to follow, a series of openings 80a are formed therein at selected intervals generally corresponding to the spacing between the spiders. Welded, or fixed by other suitable means, over each of these openings 80a is a jacket 81 which likewise has an opening therein. Fixed to the drive shaft 90 at these selected intervals is a series of beveled pinion gears 92 which are exposed through the openings in the main support tube 80 and the jacket 81. Each spider and pinion gear is mounted such that the internal beveled gear carried by each spider meshes with the particular pinion exposed adjacent thereto.

To support the main drive shaft 90, a series of bearings 94 are secured about the shaft at intervals terminating adjacent each pinion gear 92. Each bearing 94 is housed with a bearing casting 96 which is secured to a roller support casting 98 by a pair of bolts 99. Both the roller support casting 98 and the bearing support casting 96 are secured to the jacket 81 by the same bolts 99, as best seen in FIGS. 4 and 5. Rotatively mounted to each collar support casting 98 about an axis extending generally parallel to the axis of drive shaft 90, is a roller 100 which is vertically spaced from a respective pinion gear 92 and engaged with a circular track 76a formed around said internal gear 76. The presence of the roller 100 assumes continuous meshing engagement between the internal gears 76 and pinion gears 92.

Completing the reel assembly structure is a series of tine bars 102 interconnected between outer and inner spiders of each reel section. Depending from each tine bar is a series of laterally spaced generally downwardly extending tines 104 that during operation engage the crop material and sweep it downwardly past the cutter bar assembly 36 where the crop material is cut. For a complete and detailed understanding of the relationship between the tine bars 102 and the spiders between which the tine bars extend, one is again directed to the complete disclosure set forth in the parent application, U.S. Ser. No. 71,551.

In operation, the mower conditioner 10 is pulled through a field of standing crop material. The pusher bar 31 tends to push the standing crop over and the reel assembly engages the crop material and sweeps it past the cutter bar which cuts the crop material. Once the crop material is cut, the converging reel sections 42,44 converge the crop material and sweep it into the upper and lower conditioning rolls 38,40. The conditioning rolls, which are of less width than the cutting width of the mower conditioner, engaged the crop material carrying it between the two rolls and depositing it therebehind where the windrow shield 33 further tends to converge the conditioned crop and deposit it in a relatively narrow windrow.

From FIGS. 1 and 3, it is noted that the inner portions of each reel section 42,44 are disposed in overlapping relationship with the tine bars 102 and the spider arms of each reel section being in staggered relationship. Therefore, to avoid interference and collision between the two reel sections 42,44 it becomes extremely critical that both reel sections be driven in time relationship. To yield this time relationship drive for the two reel sections 42,44, the present reel drive train utilizes basically a gear drive. In this gear drive, driving torque is applied to the main drive shaft 90 through a drive sheave 66. The driving torque of the drive shaft 90 is transferred to each spider through an internal bevel gear set which includes the pinion gears 92 and internal gears 76 already described. Therefore, for each revolution of the main drive shaft 90 both reel sections 42,44 are rotated through the same corresponding angle, thereby yielding the desired timed drive.

Also it is noted that the driving torque required to drive the entire reel assembly is distributed among each individual spider, thereby reducing the structural strength requirements of the entire reel assembly. Also, it is noted that the engagement of the roller 100 with the track 76a formed around each internal gear, assures that the pinion gears and internal gears are continually in a meshed engagement.

The terms, "upper," "lower," "forward," "rearward" etc. have been used herein merely for the convenience of the foregoing specification and in the appended claims to describe the reel drive train and its parts as oriented in the drawings. It is to be understood, however, that these terms are in no way limiting to the invention since the reel drive train may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described my invention, what I claim is:

1. In a rotatively mounted crop gathering reel having a pair of spiders interconnected by crop engaging elements, the improvement comprising a direct gear drive for rotatively driving said reel, comprising: drive gear means operatively associated with said reel, said drive gear means including at least one internal gear fixed in coaxial relationship with at least one spider, a support means having an opening therein, said spider and associated internal gear being mounted on said support means for rotation therewith adjacent said opening in said support, a main drive shaft extending adjacent said drive gear means, said main drive shaft being rotatively mounted within said support means extending generally through said internal gear and associated spider, pinion gear means fixed to said drive shaft and spaced thereon so as to be in registration with the opening in said support means and extending there through to mesh with said drive gear means for transferring the torque of said drive shaft to said drive gear means and said reel, and means for driving the drive shaft such that the torque generated by the rotation thereof is transferred to the reel through the drive and pinion gear means.

2. A direct drive for a crop gathering reel, as recited in claim 1, wherein a roller is rotatively mounted from a support structure extending from said support tube, said roller being vertically spaced relative to said pinion gear means and engaged with said internal gear for maintaining engagement between said pinion gear means and said internal gear.

3. A drive train for a multiple reel assembly comprising in combination: a reel assembly including a series of reel sections disposed generally in side-by-side relationship; at least one drive gear operatively associated with each reel section for driving the same; a main drive shaft having a series of pinion gears associated therewith, each pinion gear being meshed with a respective drive gear for driving the same; and means for driving said main drive shaft for transferring the torque thereof to each of said reel sections, thereby driving each reel section of said reel assembly simultaneously and in timed relationship.

4. A drive train for a multiple reel assembly, as recited in claim 3, wherein each reel section includes at least one spider and wherein said drive gear associated with each reel section is mounted coaxially to a spider.

5. A drive train for multiple reel assembly, as recited in claim 4, wherein said drive gear associated with each reel section comprises an internal beveled gear.

6. A drive train for a multiple reel assembly, as recited in claim 3, wherein said multiple reel assembly is disposed about an elongated support tube with each reel section including at least one spider rotatively mounted about the axis of said support tube; said drive gear associated with each reel section comprising an internal gear fixed directly to said spider; and wherein said main drive shaft is journalled within said support tube, said support tube including openings formed therein adjacent each spider end internal gear, said pinion gears being spaced on said drive shaft to lay open through said openings in said support tube for meshing engage-ment with said internal gears.

7. A drive train for a multiple reel assembly, as recited in claim 6, wherein means are provided for continually engaging said internal gears and maintaining them in meshed relationship with said pinion gears.

8. A drive train for a crop gathering reel assembly, comprising in combination: a main support tube; a pair of reel sections, each reel section disposed generally on one side of said main support tube and including a pair of transversely spaced spiders, each spider being rotatively mounted to said main support tube and having a plurality of arms extending radially therefrom; a series of tine bars interconnected between corres-ponding arms of the two spiders of each reel section, each tine bar including a plurality of tines extending therefrom; an internal gear fixed to at least one spider of each reel section; a main drive shaft journalled within said main support tube; a pinion gear meshed with each of said internal gears, each pinion gear being fixed to and rotatable with said main drive shaft; and means for driving said main drive shaft for transferring the torque thereof to the pinion and internal gears, thereby driving the spiders of each reel section in timed relationship.

9. A drive train for a crop gathering reel assembly, as recited in claim 8, wherein said spiders are disposed obliquely to the axis of said main support tube, with the spiders of each reel section lying in parallel planes, and wherein said pinion and internal gears include beveled teeth.

10. A drive train for a crop gathering reel assembly, as recited in claim 9, wherein said main support tube includes a series of axially spaced openings formed within the surface thereof, and wherein said pinion gears are particularly spaced along said drive shaft to extend through said openings for engagement with said internal beveled gears.

11. A drive train for a crop gathering reel assembly, as recited in claim 9, wherein a roller is vertically spaced from each of said pinion gears and engaged with a track formed around a portion of said internal gear for assuring a meshed relationship between each pinion and internal gear.

* * * * *